(12) United States Patent
Hou et al.

(10) Patent No.: US 10,128,730 B2
(45) Date of Patent: Nov. 13, 2018

(54) VIBRATION MOTOR

(71) Applicants: Fei Hou, Shenzhen (CN); Lubin Mao, Shenzhen (CN); Hongxing Wang, Shenzhen (CN)

(72) Inventors: Fei Hou, Shenzhen (CN); Lubin Mao, Shenzhen (CN); Hongxing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 195 days.

(21) Appl. No.: 15/254,250

(22) Filed: Sep. 1, 2016

(65) Prior Publication Data

US 2017/0117788 A1 Apr. 27, 2017

(30) Foreign Application Priority Data

Oct. 21, 2015 (CN) .......................... 2015 1 0686640

(51) Int. Cl.
*H02K 33/00* (2006.01)
*H02K 1/34* (2006.01)
*H02K 5/04* (2006.01)
*H02K 33/16* (2006.01)

(52) U.S. Cl.
CPC ............... *H02K 33/00* (2013.01); *H02K 1/34* (2013.01); *H02K 5/04* (2013.01); *H02K 33/16* (2013.01)

(58) Field of Classification Search
CPC ............ H02K 33/00; H02K 5/04; H02K 1/34
USPC .................................. 310/25, 14, 15, 36, 20
See application file for complete search history.

(56) References Cited

U.S. PATENT DOCUMENTS

| 9,912,217 | B2 * | 3/2018 | Xu ......................... H02K 33/16 |
| 2011/0018367 | A1 * | 1/2011 | Kim ........................ B06B 1/045 |
| | | | 310/25 |
| 2012/0169148 | A1 * | 7/2012 | Kim ........................ H02K 33/16 |
| | | | 310/25 |
| 2014/0152126 | A1 * | 6/2014 | Kim ........................ B06B 1/045 |
| | | | 310/25 |
| 2016/0013710 | A1 * | 1/2016 | Dong ...................... H02K 33/16 |
| | | | 310/25 |

* cited by examiner

*Primary Examiner* — Hanh Nguyen
(74) *Attorney, Agent, or Firm* — Na Xu; IPro, PLLC

(57) ABSTRACT

A vibration motor includes a fixation part having a housing forming an accommodation space and at least one coil fixed in the accommodation space, a vibration part including a magnet and a weight for accommodating the magnet, an elastic connecting part for suspending the vibration part in the accommodation space; a damping element accommodated in the weight; a limiting column penetrating the damping element and extending along a direction from the magnet to the coil, two ends of the limiting column being fixed to the housing.

13 Claims, 3 Drawing Sheets

VIBRATION MOTOR

FIELD OF THE INVENTION

The present disclosure is related to vibration motors, specifically related to a vibration motor for portable consumer electronic products.

DESCRIPTION OF RELATED ART

A vibration motor is applied to feedback of system generally, for example, incoming call prompt, message prompt and navigation prompt of mobile phone, vibration feedback of game player, etc. for portable consumer electronic products, such as mobile phone, handheld game player, navigation unit or handheld multimedia entertainment equipment which is more and more popular with people along with the development of the electronic technique.

A related vibration motor comprises a fixation part, a vibration part installed in the fixation part and an elastic connecting part. The fixation part comprises a housing and a cover plate by which an accommodation space is formed; the vibration part comprises coils or a magnet; the vibration part is suspended and supported in the accommodation space by using the elastic connecting part. The displacement along the length direction (the vibration direction) of the vibration motor shall be generated, as well as the displacement vertical to the vibration direction by the vibration part during vibration. Therefore, the displacement vertical to the vibration direction and generated by the vibration part during vibration shall be limited in order to ensure the excellent working effect of the vibration motor and prevent the vibration part from being invalid after colliding with the housing during vibration.

Therefore, an improved vibration motor which can overcome the problems mentioned above is accordingly desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

Figure 1:
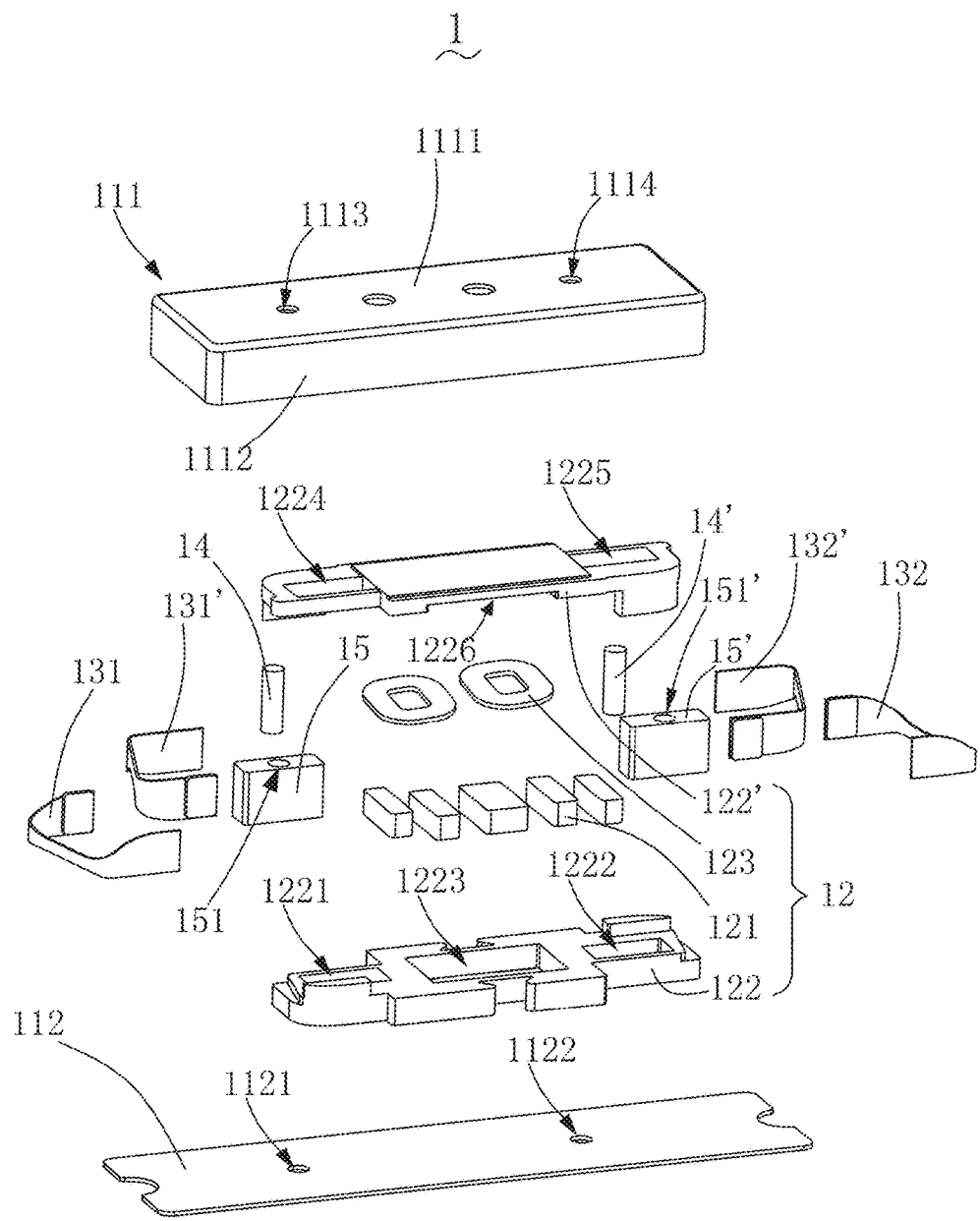
FIG. 1 is an isometric and exploded view of a vibration motor in accordance with a first exemplary embodiment of the present disclosure.
Figure 2:
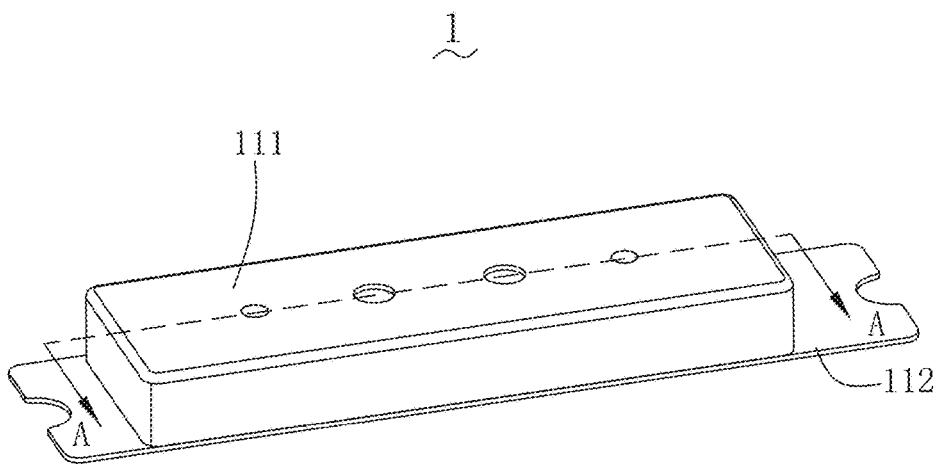
FIG. 2 is an isometric assembled view of the vibration motor in FIG. 1.

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby are only to explain this disclosure, not intended to limit this disclosure.

Referring to FIGS. 1-4, a vibration motor 1 in accordance with a first exemplary embodiment of the present disclosure, comprises a fixation part 11, a vibration part 12, a plurality of elastic connecting parts 131, 131', 132, 132', a plurality of limiting columns 14,14', and a plurality of damping elements 15, 15'.

The fixation part 11 comprises a housing 110 which includes an upper housing 111 and a cover plate 112; and an accommodation space 113 is accordingly formed cooperatively by the upper housing 111 and the cover plate 112.

The upper housing 111 comprises a top wall 1111, a side wall 1112 extending from the top wall 1111 in the zigzag form, a plurality of welding holes 1113 1114 arranged on the top wall 1111 and penetrating the top wall 1111.

The cover plate 112 is used for covering of an opening of the upper housing 111, and formation of the accommodation space 113 with the upper housing 111 in order to accommodate the vibration part 12, the elastic connecting parts 131, 131', 132 and 132', the limiting columns 14 and 14' and the damping elements 15 and 15'.

The vibration part 12 includes a magnet 121, a first weight 122, a second weight 122 ' and coils 123. The magnet 121 is accommodated in the first weight 122; the coils 123 are arranged on the second weight 122'. Moreover, the magnet 121 and the coils 123 are arranged to be opposed to each other. The elastic connecting parts includes first elastic connecting parts 131-132 for suspending the first weight 122, and second elastic connecting parts 131'-132' for suspending the second weight 122'. With the interaction between the coil 123 and the magnet 121, the first weight 122 vibrates in a direction opposite to a vibration direction of the second weight 122'.

The first weight 122 comprises a magnet groove 1223 formed in a middle part, and a plurality of first accommodation holes 1221, 1222 arranged on two sides of the magnet groove 1223 symmetrically; and the second weight 122' comprises a coil groove 1226 formed in a middle part thereof and a plurality of second accommodation holes 1224, 1225 arranged on two sides of the coil groove 1226 symmetrically. Moreover, the first accommodation holes 1224, 1225 of the second weight 122' are arranged in the vertical direction corresponding to the second accommodation holes 1221, 1222 of the first weight 122 respectively. The damping element 15 runs through the first accommodation hole 1221 and the second accommodation hoe 1224 so as to penetrate the first weight 122 and the second weight 122'. The damping element 15' runs through the first accommodation hole 1222 and the second accommodation hoe 1225 so as to penetrate the first weight 122 and the second weight 122'.

The limiting columns 14, 14' extend along a direction pointing to the coil 123 from the magnet 121 and penetrate the first weight 122 and the second weight 122' respectively; two ends of the two limiting columns run through and welded in the welding holes 1113, 1121, 1114 and 1122 respectively. The damping elements 15 and 15' are accommodated in the accommodation holes 1221, 1222, 1224 and 1225 respectively and have limiting column holes 151 and 151' formed in the extension direction thereof; the limiting columns 14 and 14' are accommodated in the limiting column holes 151 and 151'; the thicknesses of the damping elements 15 and 15' in the extension direction of the limiting columns 14 and 14' shall be not less than the thicknesses of the first weight 122 and the second weight 122' in the identical direction; therefore, the damping element can provide the buffering force when the vibration motor falls in order to prevent the vibration part form damage. Moreover, the damping element 15 and 15' can also be used for providing the damping force in the vibration direction of the vibration motor 1.

The magnet 121 is arranged on the magnet groove 1223 of the weight 122, and a first vibration part can be formed by combining the magnet 121 with the weight 122; the coil 123 is arranged in the coil groove 1226 of the weight 122', and a second vibration part can be formed by combining the coils 123 with the weight 122'.

Figure 3:
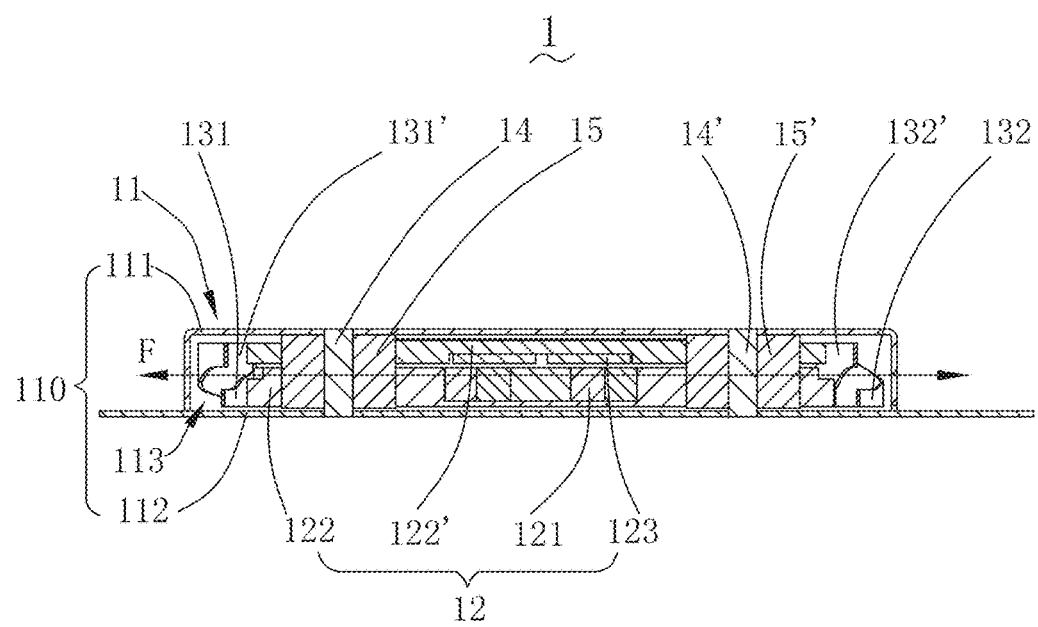
FIG. 3 is a cross-sectional view of the vibration motor taken along Line A-A in FIG. 2.
Figure 4:
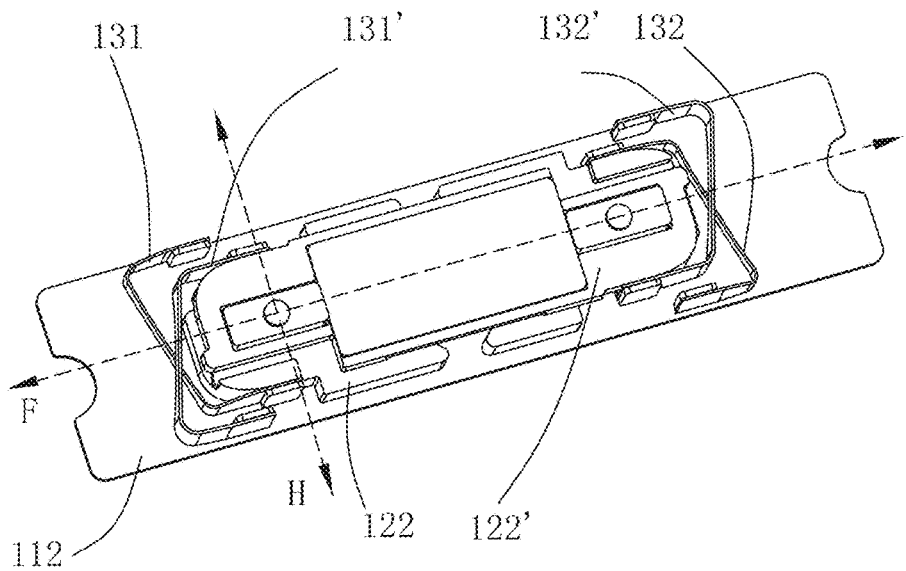
FIG. 4 is an isometric view of the vibration motor, wherein an upper housing thereof has been removed.

Please refer to FIGS. 3-4, the elastic connecting parts 131, 131', 132, and 132' are connected with the inner wall of the upper housing 111 respectively and fixedly; the magnet 121 and the weight 122 are suspended and supported in the accommodation space 113 by the elastic connecting parts 131 and 132, while the weight 122' and the coils 123 are suspended in the accommodation space 113 by using the elastic connecting parts 131' and 132'. Specifically, the elastic connecting parts 131 and 132 are arranged on two ends of the vibration direction of the first weight 122, one side of each of the elastic connecting parts 131 and 132 is connected with the first weight 122, and the other side is connected with the upper housing 111; while the elastic connecting parts 131' and 132 are arranged on two ends of the vibration direction of the second weight 122', and one side of each of the elastic connecting parts 131' and 132' is connected with the second weight 122', and the other side thereof is connected with the upper housing 111.

The direction F shown in FIG. 3 refers to the length direction (vibration direction) of the vibration motor 1; direction H shown in FIG. 4 refers to the direction vertical to the vibration direction. Moreover, the motion displacement shall be generated by the vibration motor 1 during vibration in the direction F and the direction H.

The vibration effect along the direction F shall be optimal when the vibration motor 1 works; and the limiting columns 14 and 14' shall be connected with the fixation part 11 thoroughly, the damping elements 15 and 15' shall be connected with the first weight 122 and the second weight 122' thoroughly, and the limiting columns 14 and 14' shall be connected with the damping elements 15 and 15' in order to reduce loss of the vibration motor 1 during vibration while avoid vibration in direction H; therefore, the displacements of the first weight 122 and the second weight 122' can be limited along the direction H, and collisions of the first weight 122 and the second weight 122' with the side wall 1112 of the upper housing 111 can be prevented. Moreover, the vibration of the vibration motor 1 shall be ensured by using the limiting columns 14 and 14' along the direction F in the form of straight line.

The first weight 122 and the second weight 122' may generate impact displacements along the direction F and the direction H due to the falling impacts when the vibration motor 1 falls. The limiting column 14 and 14' and the fixation part 11 have the fixation portions by which the damping elements 15 and 15' running through the limiting column 14 and 14' can be kept at the positions corresponding to the welding holes 1111, 1112, 1121 and 1122. The buffering effect for the first weight 122 and the second weight 122' may be generated by the damping elements 15 and 15' when meeting impact as a result of falling; therefore, the first weight 122, the second mass 122' or the limiting columns 14 and 14' can be prevented from damage, and the reliability of fall protection to the first weight 122 and the second weight 122' can be improved.

The two ends of the limiting columns are fixed on the upper housing 111 and the cover plate 112 respectively, and the limiting columns 14 and 14' are supported by the fixation portions thereof; therefore the fixation portions can improve the bending strength of the limiting columns 14 and 14' when the first weight 122 and the second weight 122' vibrates.

In this embodiment, the damping elements 15 and 15' are prepared from foam.

To be sure, the first vibration part is formed by combining the magnet 121 with the second weight 122', and the second vibration part is formed by combining the coils 123 with the first weight 122 in this mode of execution; therefore, the technical solution capable of implementing the invention according to the theorem should be included in the scope of patent protection of the invention.

Figure 5:
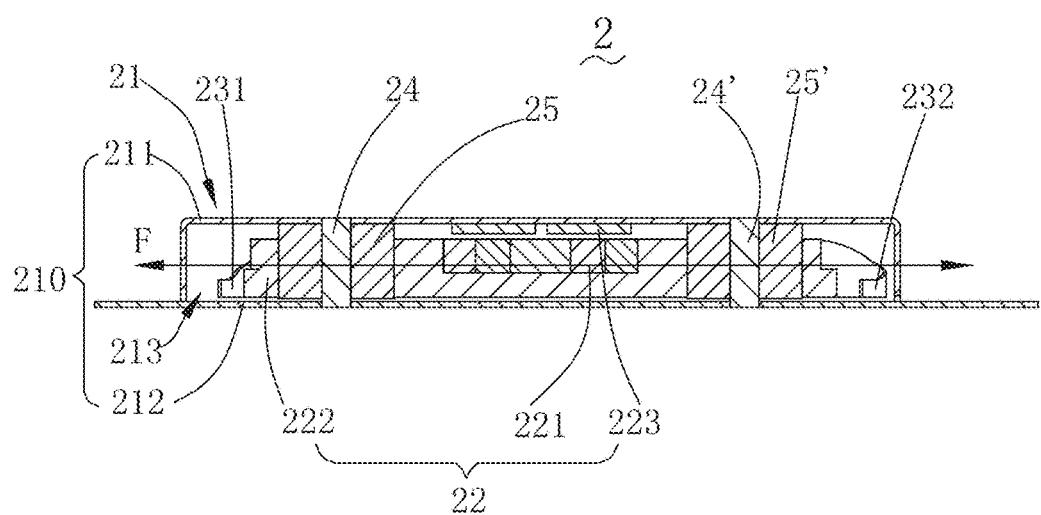
FIG. 5 is a cross-sectional view of a vibration motor in accordance with a second exemplary embodiment of the present disclosure.

Referring to FIG. 5, a vibration motor 2 in accordance with a second embodiment of the present disclosure comprises a fixation part 21, a vibration part 22, a plurality of elastic connecting parts 231, 232, a plurality of limiting columns 24, 24', and a plurality of damping elements 25,25', wherein the limiting columns 24 and 24' run through the vibration part 22 and the two ends thereof are fixed on the fixation part 21; and the damping elements 25 and 25' are sleeved on the limiting columns 24, and 24'.

The fixation part 21 comprises a housing 210 having an accommodation space and a plurality of coils 223 fixed in the accommodation space 213. Moreover, the housing 210 comprises an upper housing 211 and a cover plate 212 forming the accommodation space 213 with the upper housing 211.

The vibration part 22 comprises a magnet 221 and a weight 222 for accommodating the magnet 221; and the magnet 221, the weight 222 and the elastic connecting parts 231 and 232 are arranged in the accommodation space 213. Moreover, the magnet 221 and the coils are arranged in parallel and oppositely with interval.

The magnet 221 and the weight 222 are suspended and supported in the accommodation space 213 by using the elastic connecting parts 232 and 232.

The limiting columns 24 and 24' extend along the direction pointing to the coil 223 from the magnet 221 and run through the first weight 222 and the upper housing 211 and the cover plate; two ends of the two limiting columns 24 and 24' are welded with the upper housing 211 and the cover plate, respectively. The damping elements 25 and 25' are sleeved on the limiting columns 24 and 24' and accommodated in the weight 222, and the thicknesses thereof in the extension direction of the limiting column 24 and 24' shall be not less than the thickness of the weight 222 in the identical direction; therefore, the damping element can provide the buffering force when the vibration motor falls in order to prevent the vibration part form damage. Moreover, the damping element 25 and 25' can also be used for providing the damping force in the vibration direction of the vibration motor 2.

The direction F shown in FIG. 5 refers to the length direction (vibration direction) of the vibration motor 2, which is identical with that in the Embodiment 1; and the motion displacements in the direction F and vertical to the direction F may be generated by the vibration motor 2 during vibration.

The motion displacement vertical to the direction F of the weight 222 can be limited synchronously by the limiting columns 24 and 24' and the damping elements 24 and 25', in order to prevent the weight 222 from collision with the side of the upper housing 211.

The vibration of the vibration motor 2 can be kept along the direction F straightly by using the limiting columns 24 and 24'.

The weight 222 moves along the direction F; the buffering effect of the damping elements 25 and 25' can prevent the weight 222 from direct collision with the limiting column 24 during falling; therefore, the weight 222 or the limiting columns 24 and 24' can be prevented from damage, and the reliability of fall protection to the weight 222 can be improved.

In this embodiment, connection parts are available at the contacting places between the limiting columns 24 and 24' and the cover plate 212 respectively; the limiting columns 24 and 24' are supported by using the connection parts. Moreover, the bending strengths of the limiting columns 24 and 24' can be improved by using the connection parts when the weight 22 vibrates.

In this embodiment, the damping elements 25 and 25' are prepared from foam.

Compared with relevant technologies, the limitation 14, 14', 24 and 24' of the vibration motors 1 and 2 provided in the invention run through the weights 122, 122' and 222, the upper housings 111 and 211 and the cover plates 112 and 212; the damping elements 15, 15', 25 and 25' are arranged around the limiting columns which can prevent the weights 122, 122' and 222 from collision with the upper housings 111 and 211 during vibration; said limiting columns 14, 14', 24 and 24' are supported by the upper housings 111 and 211 and the cover plates 112 and 212, therefore, the bending strengths of the limiting columns 14, 14', 24 and 24' can be improved. The displacements of the weights 122, 122' and 222 are limited in the direction vertical to the vibration direction by using the damping elements 15, 15', 25 and 25' in order to ensure the vibration thereof along the straight line; and the direct collision of the weights 122, 122' and 222 and the limiting columns 14, 14', 24 and 24' can be prevented, and the damage to the weights 122, 122' and 222 or the limiting columns 14, 14', 24 and 24' can be avoided due to buffering effect of the damping elements 15, 15', 25 and 25'; therefore, the vibration effect and the service life of the vibration motors 1 and 2 can be improved.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
    a fixation part comprising a housing having an accommodation space and at least one coil fixed in the accommodation space,
    a vibration part comprising a magnet and a weight for accommodating the magnet, the magnet being disposed to be opposed to the coil;
    an elastic connecting part for suspending the vibration part in the accommodation space;
    a damping element accommodated in the weight;
    a limiting column penetrating the damping element and extending along a direction from the magnet to the coil, two ends of the limiting column being fixed to the housing.

2. The vibration motor as described in claim 1, wherein the housing comprises an upper housing and a cover plate for forming the accommodation space; the upper housing comprises a top wall opposite to the cover plate; and the two ends of the limiting column are fixed respectively on the top wall and the cover plate.

3. The vibration motor as described in claim 2, wherein a plurality of welding holes are disposed on the top wall and the cover plate; and two ends of the limiting column are welded in the welding holes.

4. The vibration motor as described in claim 1, wherein a thickness of the damping element in the extension direction of the limiting column is not less than a thickness of the weight in the same direction.

5. The vibration motor as described in claim 1, wherein the amount of the damping elements and the limiting columns are two.

6. The vibration motor as described in claim 1, wherein the damping element is made from foam.

7. A vibration motor, comprising:
    a fixation part comprising a housing and a cover plate forming an accommodation space with the housing;
    a vibration part comprising a weight including a first weight and a second weight, a magnet located on the second weight, and at least one coil arranged opposite to the magnet and located on the first weight;
    an elastic connecting part for suspending the vibration part in the accommodation space, the elastic connecting part comprising a first elastic connecting part for suspending the first weight in the accommodation space and a second elastic connecting part for suspending the second weight in the accommodation space, with a vibration direction of the first weight opposite to a vibration direction of the second weight;
    a damping element accommodated in the weight;
    a limiting column penetrating the damping element, the limiting column extending along a direction from the magnet to the coil, two ends of the limiting column being fixed to the housing.

8. The vibration motor as described in claim 7, wherein the housing comprises an upper housing and a cover plate forming the accommodation space with the upper housing; the upper housing comprises a top wall opposite to the cover plate; and the two ends of the limiting column are fixed on the top wall and the cover plate, respectively.

9. The vibration motor as described in claim 8, wherein a plurality of welding holes are disposed on the top wall and the cover plate; and two ends of the limiting column are welded in the welding holes.

10. The vibration motor as described in claim 7, wherein a thickness of the damping element in the extension direction of the limiting column is not less than a thickness of the weight in the same direction.

11. The vibration motor as described in claim 7, wherein the damping element penetrates the first weight and the second weight along the direction from the magnet to the coil.

12. The vibration motor as described in claim 11, wherein, a first accommodation hole is formed on the first weight, a second accommodation hole is formed on the second weight, the first accommodation hole is aligned with the second accommodation hole, and the damping element penetrates the weigh by running through the first accommodation hole and the second accommodation hole.

13. The vibration motor as described in claim 7, wherein the damping element is made from foam.

* * * * *